(12) United States Patent
MacNeil et al.

(10) Patent No.: US 11,307,981 B1
(45) Date of Patent: Apr. 19, 2022

(54) SYSTEMS AND METHODS FOR SHARING MEMORY POINTERS ACROSS MULTIPLE PROCESSES

(71) Applicant: Juniper Networks, Inc., Sunnyvale, CA (US)

(72) Inventors: Erin C. MacNeil, Sunnyvale, CA (US); Amit Kumar Rao, Sunnyvale, CA (US); Finlay Michael Graham Pelley, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 46 days.

(21) Appl. No.: 16/870,977

(22) Filed: May 10, 2020

(51) Int. Cl.
*G06F 12/02* (2006.01)
*G06F 12/1045* (2016.01)
*G06F 9/54* (2006.01)
*G06F 13/16* (2006.01)
*G06F 12/1036* (2016.01)

(52) U.S. Cl.
CPC .......... *G06F 12/0246* (2013.01); *G06F 9/544* (2013.01); *G06F 12/1036* (2013.01); *G06F 12/1063* (2013.01); *G06F 13/1663* (2013.01)

(58) Field of Classification Search
None
See application file for complete search history.

(56) References Cited

U.S. PATENT DOCUMENTS

| 6,629,153 | B1* | 9/2003 | Gupta | G06F 9/465 719/316 |
| 8,635,412 | B1* | 1/2014 | Wilshire | G06F 13/28 711/147 |
| 2008/0140971 | A1* | 6/2008 | Dankel | G06F 12/0284 711/163 |
| 2016/0342399 | A1* | 11/2016 | Gopalakrishnan | G06F 12/109 |
| 2017/0177429 | A1* | 6/2017 | Stark | G06F 21/60 |
| 2017/0344468 | A1* | 11/2017 | Kirshenbaum | G06F 12/023 |
| 2018/0157442 | A1* | 6/2018 | Vorobyov | G06F 3/0604 |
| 2018/0322058 | A1* | 11/2018 | Tourrilhes | G06F 12/0815 |
| 2020/0104196 | A1* | 4/2020 | Ritchie | G06F 9/44536 |

* cited by examiner

*Primary Examiner* — Tracy C Chan
(74) *Attorney, Agent, or Firm* — FisherBroyles, LLP

(57) ABSTRACT

A disclosed method may include (1) mapping a block of shared memory to a plurality of processes running on a computing device, (2) determining, for a process within the plurality of processes, a local pointer that references a specific portion of the block of shared memory from a shared memory pointer that is shared across the plurality of processes by (A) identifying, within the shared memory pointer, a block number assigned to the block of shared memory and (B) identifying, within the shared memory pointer, an offset that corresponds to the specific portion of the block of shared memory relative to the process, and then (3) performing an operation on the specific portion of the block of shared memory based at least in part on the local pointer. Various other systems, methods, and computer-readable media are also disclosed.

13 Claims, 7 Drawing Sheets

SYSTEMS AND METHODS FOR SHARING MEMORY POINTERS ACROSS MULTIPLE PROCESSES

BACKGROUND

Shared memory often refers to memory that is allocated for simultaneous use by multiple processes. Accordingly, multiple processes may be able to access (e.g., read and/or write) data within shared memory simultaneously. By enabling these processes to access such data in this way, the shared memory may effectively provide communication among such processes and/or facilitate the sharing of data across such processes. For example, these processes may be able to share data with one another by having one of the processes write the data to the shared memory and having another one of the processes then read the data from the shared memory.

In traditional shared memory technologies, multiple processes may need to map a shared memory block to a virtual address. However, these processes may be unable to map the shared memory block to the same virtual address. In other-words, each process may end up mapping a single shared memory block to different virtual addresses.

Unfortunately, mapping the shared memory block to different virtual addresses across these processes may lead to and/or cause certain problems and/or errors. For example, if each shared memory block is mapped to different virtual addresses across these processes, and data structure memory pointers are exchanged via the shared memory blocks, one or more of these processes may be unable to access such data structure memory locations. Moreover, if one of the shared memory blocks has grown due to the addition of data structures, one or more of these processes may no longer be able to access a specific portion of the shared memory block due to the corresponding offset now exceeding and/or over-running the region of memory allocated to the shared memory block.

The instant disclosure, therefore, identifies and addresses a need for additional and improved systems and methods for sharing memory pointers across multiple processes.

SUMMARY

As will be described in greater detail below, the instant disclosure generally relates to systems and methods for sharing memory pointers across multiple processes. In one example, a method for accomplishing such a task may include (1) mapping a block of shared memory to a plurality of processes running on a computing device, (2) determining, for a process within the plurality of processes, a local pointer that references a specific portion of the block of shared memory from a shared memory pointer that is shared across the plurality of processes by (A) identifying, within the shared memory pointer, a block number assigned to the block of shared memory and (B) identifying, within the shared memory pointer, an offset that corresponds to the specific portion of the block of shared memory relative to the process, and then (3) performing an operation on the specific portion of the block of shared memory based at least in part on the local pointer.

Similarly, a system that implements the above-identified method may include a physical processor configured to execute various modules stored in memory. In one example, this system may include and/or execute (1) a mapping module that maps a block of shared memory to a plurality of processes running on a computing device, (2) a determination module that determines, for a process within the plurality of processes, a local pointer that references a specific portion of the block of shared memory from a shared memory pointer that is shared across the plurality of processes by (A) identifying, within the shared memory pointer, a block number assigned to the block of shared memory and (B) identifying, within the shared memory pointer, an offset that corresponds to the specific portion of the block of shared memory relative to the process, and (3) an operation module that performs an operation on the specific portion of the block of shared memory based at least in part on the local pointer.

Additionally or alternatively, a non-transitory computer-readable medium that implements the above-identified method may include one or more computer-executable instructions. When executed by at least one processor of a computing device, the computer-executable instructions may cause the computing device to (1) map a block of shared memory to a plurality of processes running on a computing device, (2) determine, for a process within the plurality of processes, a local pointer that references a specific portion of the block of shared memory from a shared memory pointer that is shared across the plurality of processes by (A) identifying, within the shared memory pointer, a block number assigned to the block of shared memory and (B) identifying, within the shared memory pointer, an offset that corresponds to the specific portion of the block of shared memory relative to the process, and then (3) perform an operation on the specific portion of the block of shared memory based at least in part on the local pointer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
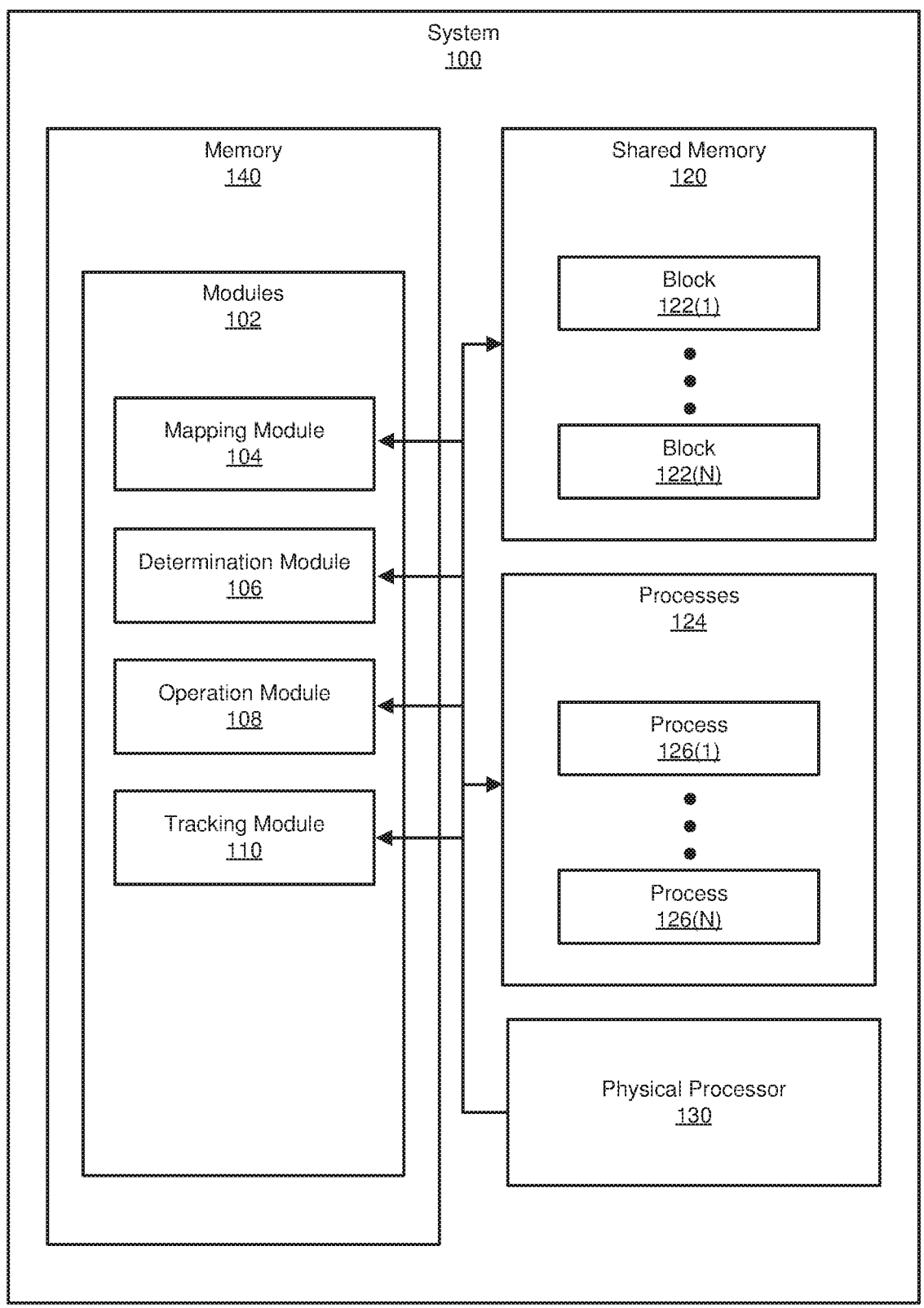
FIG. 1 is a block diagram of an exemplary system for sharing memory pointers across multiple processes.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for sharing memory pointers across multiple processes. As will be explained in greater detail below, the various systems and methods described herein may provide various benefits and/or advantages over some traditional shared memory technologies. For example, the various systems and methods described herein may enable processes that share memory to discover and/or identify data structure references added to the shared memory by one another.

Additionally or alternatively, if one process writes new data to a block of shared memory, these systems and methods may enable another process to discover and/or read that new data within the block of shared memory. Moreover, if the block of shared memory grows to the point that a shared memory pointer no longer references a region within that block, the other process may be able to detect this growth and then initiate remapping of the block. By doing so, the other process may be able to access the data referenced by the shared memory pointer despite the block having grown to the point that, but for the remapping of the block, would have rendered that data inaccessible via the shared memory pointer.

The following will provide, with reference to FIGS. 1, 2, 4, and 5 detailed descriptions of exemplary systems and corresponding implementations for sharing memory pointers across multiple processes. Detailed descriptions of an exemplary method for sharing memory pointers across multiple processes and a corresponding decision tree will be provided in connection with FIGS. 3 and 6, respectively. In addition, detailed descriptions of an exemplary computing system for carrying out these methods will be provided in connection with FIG. 7.

FIG. 1 shows an exemplary system 100 that facilitates sharing memory pointers across multiple processes. As illustrated in FIG. 1, system 100 may include one or more modules 102 for performing one or more tasks. As will be explained in greater detail below, modules 102 may include a mapping module 104, a determination module 106, an operation module 108, and a tracking module 110. Although illustrated as separate elements, one or more of modules 102 in FIG. 1 may represent portions of a single module, application, process, and/or operating system. For example, one or more of modules 102 may represent part of and/or be included in one or more processes running on a computing device.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 208, and/or network device 206) and/or the devices illustrated in FIG. 5. One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate sharing memory pointers across multiple processes. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more shared memories, such as shared memory 120. In some examples, shared memory 120 may include and/or represent a file structure, a file system, and/or a temporary file storage facility mounted or implemented at computing path "/dev/shm". In such examples, shared memory 120 may include and/or represent blocks 122(1)-(N) allocated and/or designated for simultaneous use by multiple processes (such as processes 124 in FIG. 1). In one example, one or more of blocks 122(1)-(N) may include and/or represent a specific region or range of shared memory 120. For example, a block may include and/or represent a memory mapped region of shared memory 120. In this example, the block may be mapped to different virtual addresses across multiple processes. Accordingly, each process may end up mapping a single shared memory block to different virtual addresses.

As illustrated in FIG. 1, exemplary system 100 may further include one or more processes, such as processes 124. In some examples, processes 124 may include and/or represent a set of processes 126(1)-(N) configured to run on one or more computing devices. In one example, processes 124 may run simultaneously on a single computing device. In another example, processes 124 may run simultaneously across multiple computing devices in a distributed configuration and/or deployment. Examples of processes 124 include, without limitation, applications, programs, software modules, operating system modules or threads, collections of computer-readable instructions, executables, portions of one or more of the same, combinations or variations of one or more of the same, and/or any other suitable processes.

Figure 2:
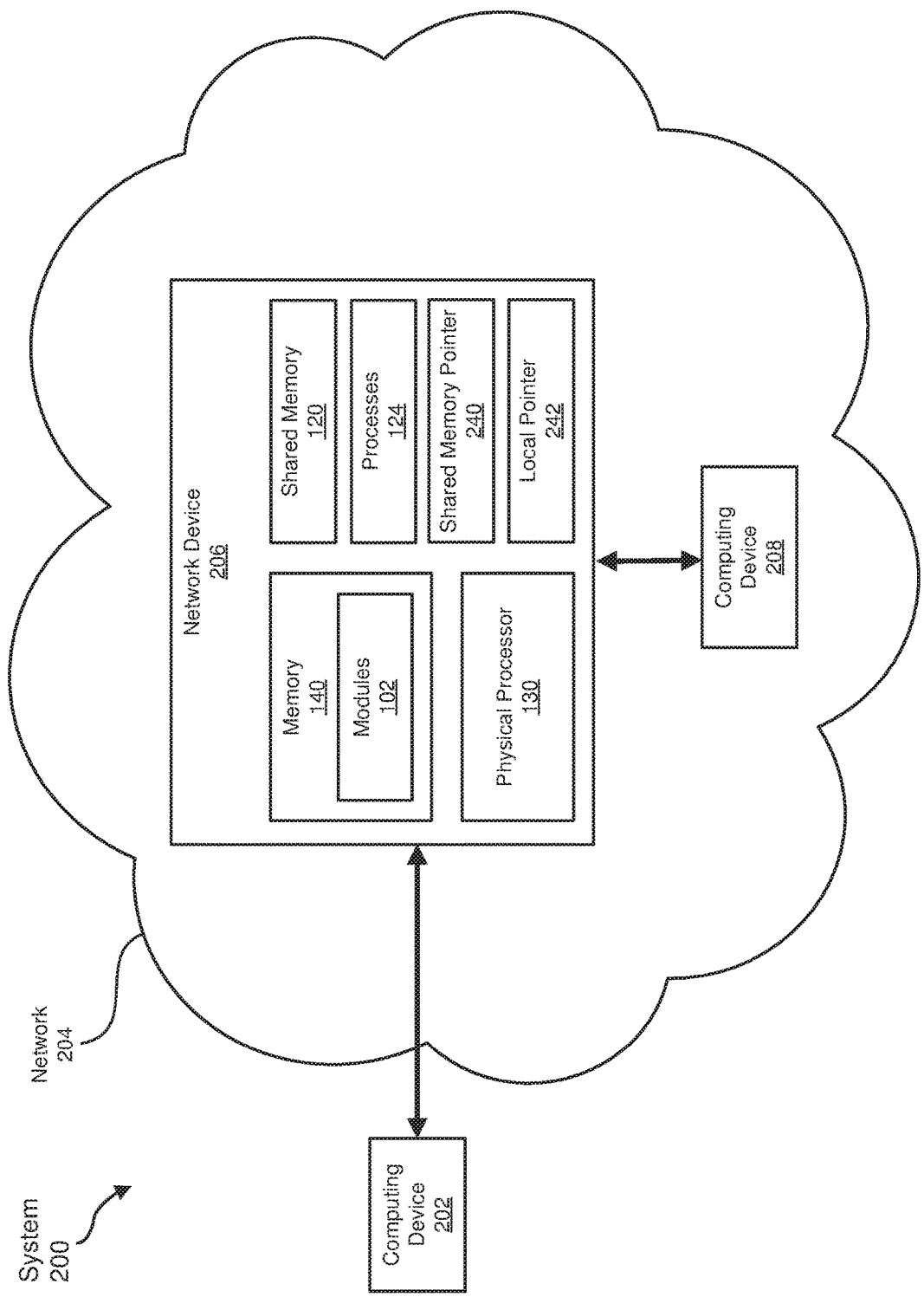
FIG. 2 is a block diagram of an additional exemplary system for sharing memory pointers across multiple processes.

In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among various computing devices, including computing device 202, computing device 208, and/or network device 206.

As illustrated in FIG. 2, network 204 may include and/or represent various network devices that form and/or establish communication paths and/or segments. For example, network 204 may include and/or represent one or more segment routing paths. Although not illustrated in this way in FIG. 2, network 204 may include and/or represent one or more additional network devices and/or computing devices.

In some examples, and as will be described in greater detail below, one or more of modules 102 may cause network device 206 to (1) map a block of shared memory 120 to a plurality of processes 124 running on network device 206, (2) determine, for one of processes 124, a local pointer that references a specific portion of the block of shared memory 120 from a shared memory pointer that is shared across processes 124 by (A) identifying, within the shared memory pointer, a block number assigned to the block of shared memory 120 and (B) identifying, within the shared memory pointer, an offset that corresponds to the specific portion of the block of shared memory 120 relative to the process, and then (3) perform an operation on the specific portion of the block of shared memory 120 based at least in part on the local pointer.

Computing device 202, computing device 208, and network device 206 each generally represent any type or form of physical computing device capable of reading computer-executable instructions and/or handling network traffic. Examples of computing device 202, computing device 208, and network device 206 include, without limitation, routers (such as provider edge routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable devices.

Network 204 generally represents any medium or architecture capable of facilitating communication or data transfer. In some examples, network 204 may include other devices not illustrated in FIG. 2 that facilitate communication and/or form part of segment routing paths. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
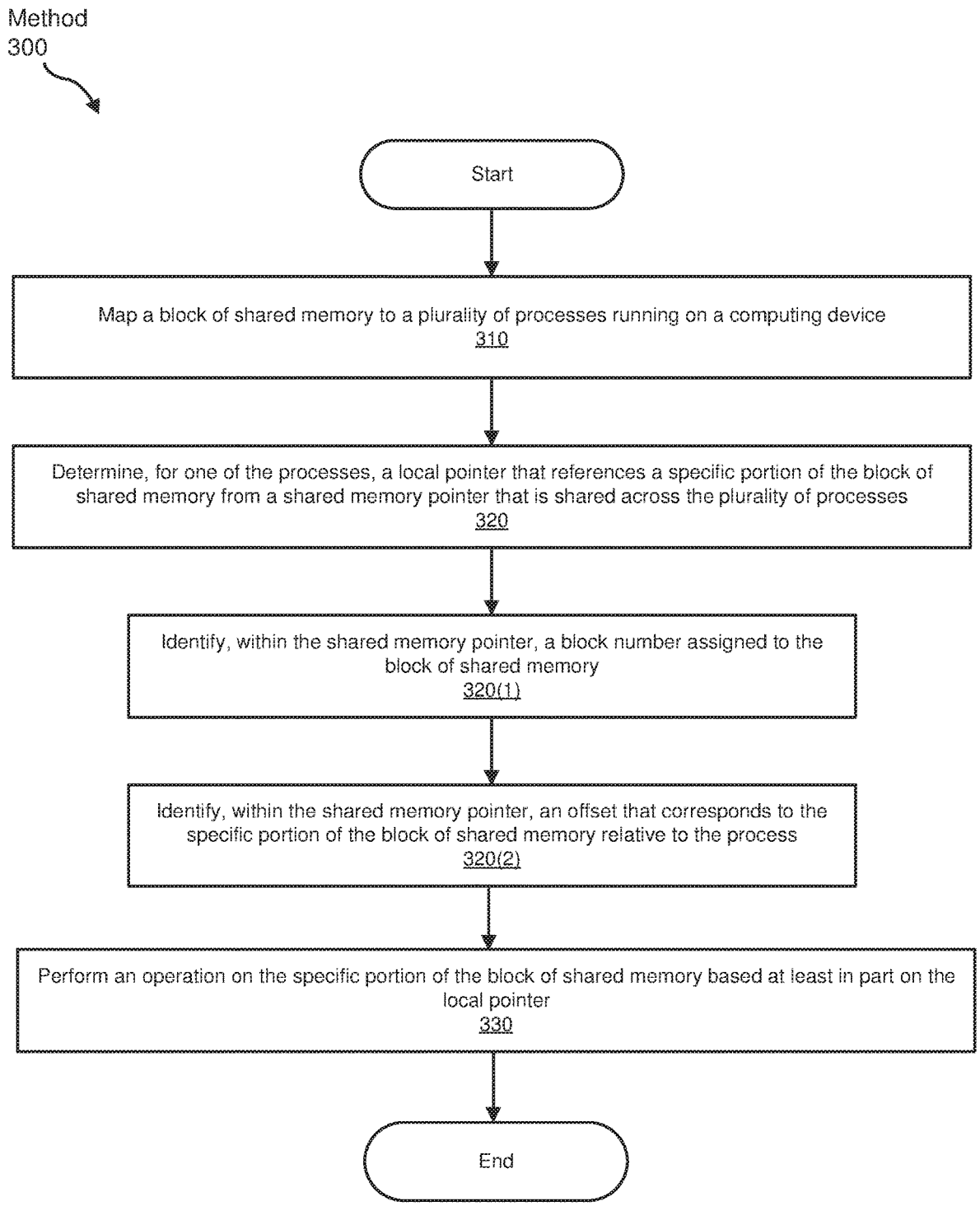
FIG. 3 is a flow diagram of an exemplary method for sharing memory pointers across multiple processes.

FIG. 3 is a flow diagram of an exemplary computer-implemented method 300 for sharing memory pointers across multiple processes. The steps shown in FIG. 3 may be performed by any suitable computer-executable code and/or computing system, including system 100 in FIG. 1, system 200 in FIG. 2, system 5 in FIG. 5, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may map a block of shared memory to a plurality of processes running on a computing device. For example, mapping module 104 may, as part of network device 206 in FIG. 2, map one or more blocks 122(1)-(N) of shared memory 120 to processes 124 running on network device 206. In one example, mapping module 104 may map block 122(1) of shared memory 120 to all of processes 124. Additionally or alternatively, mapping module 104 may map block 122(N) of shared memory 120 to at least processes 126(1) and 126(N).

The systems described herein may perform step 310 in a variety of ways and/or contexts. In some examples, mapping module 104 may load the base virtual address of block 122(1) into the virtual address space of process 126(1). In such examples, mapping module 104 may load the base virtual address of block 122(1) into the virtual address space of process 126(N). In one example, mapping module 104 may obtain and/or determine the base virtual address of block 122(1) relative to process 126(1) or 126(N) by executing and/or performing an "mmap( )" function call that returns a pointer to the base virtual address of block 122(1).

Additionally or alternatively, mapping module 104 may load the base virtual address of block 122(N) into the virtual address space of process 126(1). In such examples, mapping module 104 may load the base virtual address of block 122(N) into the virtual address space of process 126(N). In one example, mapping module 104 may obtain and/or determine the base virtual address of block 122(N) relative to process 126(1) or 126(N) by executing and/or performing an "mmap( )" function call that returns a pointer to the base virtual address of block 122(N).

In some examples, mapping module 104 may assign a block number to a block of shared memory 120. For example, mapping module 104 may assign block number "12" to block 122(1) of shared memory 120. In this example, mapping module 104 may also assign block number "26" to block 122(N) of shared memory 120.

In some examples, mapping module 104 may associate the block number assigned to block 122(1) with the base virtual address of block 122(1) loaded into the virtual address space of process 126(1). In such examples, mapping module 104 may also associate the block number assigned to block 122(1) with the base virtual address of block 122(1) loaded into the virtual address space of process 126(N).

Additionally or alternatively, mapping module 104 may associate the block number assigned to block 122(N) with the base virtual address of block 122(N) loaded into the virtual address space of process 126(1). In such examples, mapping module 104 may also associate the block number assigned to block 122(N) with the base virtual address of block 122(N) loaded into the virtual address space of process 126(N).

In some examples, tracking module 110 may track and/or maintain a tuple of data related to certain mappings made and/or established between blocks of shared memory 120 and processes 124. For example, tracking module 110 may track and/or maintain the block number assigned to block 122(1), the base virtual address of block 122(1), and/or the size of block 122(1) in connection with any or all of processes 124. In one example, mapping module 104 and/or tracking module 110 may allocate and/or designate a data structure of each of processes 124 to store and/or hold the block number assigned to block 122(1), the base virtual address of block 122(1), and/or the size of block 122(1). In this example, determination module 106 and/or tracking module 110 may obtain and/or determine the block number assigned to block 122(1) and/or the size of block 122(1) by searching, inspecting, and/or querying shared memory 120 for the corresponding block file. Additionally or alternatively, determination module 106 and/or tracking module 110 may determine the size of block 122(1) by searching shared memory 120 based at least in part on the block number. Further, mapping module 104 and/or tracking module 110 may obtain and/or determine the base virtual address of block 122(1) by executing and/or performing an "mmap( )" function call that returns a pointer to the base virtual address of block 122(1) relative to the corresponding process.

In another example, tracking module 110 may track and/or maintain the block number assigned to block 122(N), the base virtual address of block 122(N), and/or the size of block 122(N). In one example, mapping module 104 may allocate and/or designate a data structure of each of processes 124 to store and/or hold the block number assigned to block 122(N), the base virtual address of block 122(N), and/or the size of block 122(N) in connection with any or all of processes 124. In this example, mapping module 104 may obtain and/or determine the block number assigned to block 122(N) and/or the size of block 122(N) by searching, inspecting, and/or querying shared memory 120 for the corresponding block file. Additionally or alternatively, determination module 106 and/or tracking module 110 may determine the size of block 122(N) by searching shared memory 120 based at least in part on the block number. Further, mapping module 104 may obtain and/or determine the base virtual address of block 122(N) by executing and/or performing an "mmap( )" function call that returns a pointer to the base virtual address of block 122(N).

In several examples, blocks of shared memory 120 may be mapped to different virtual addresses within and/or across processes 124. For example, mapping module 104 may map block 122(1) to one virtual address of process 126(1). In this example, mapping module 104 may map block 122(1) to another virtual address of process 126(N). The mapped virtual address of process 126(1) and the mapped virtual address of process 126(N) may differ from one another.

Figure 4:
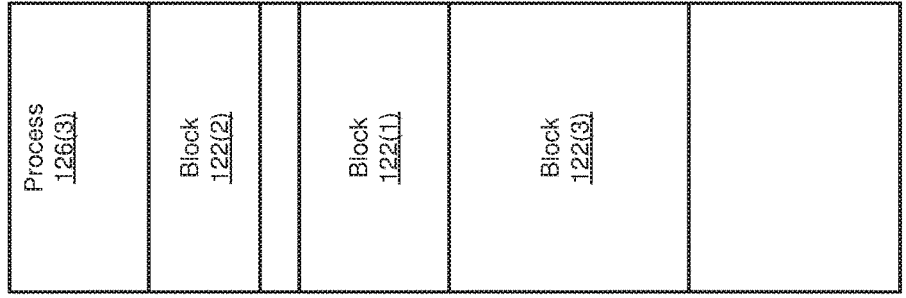
FIG. 4 is an illustration of an exemplary mapping between shared memory blocks and virtual addresses across multiple processes.
Figure 4:
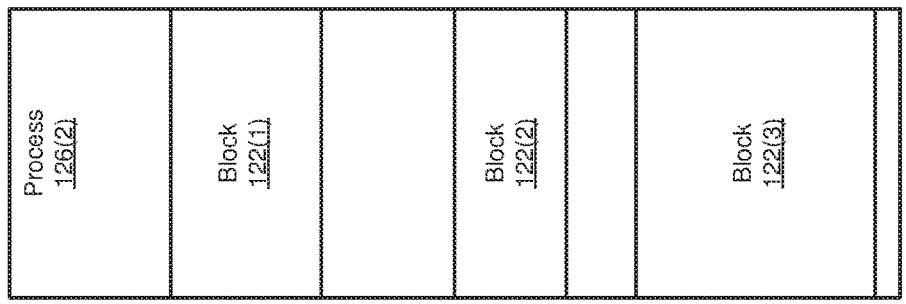
Figure 4:
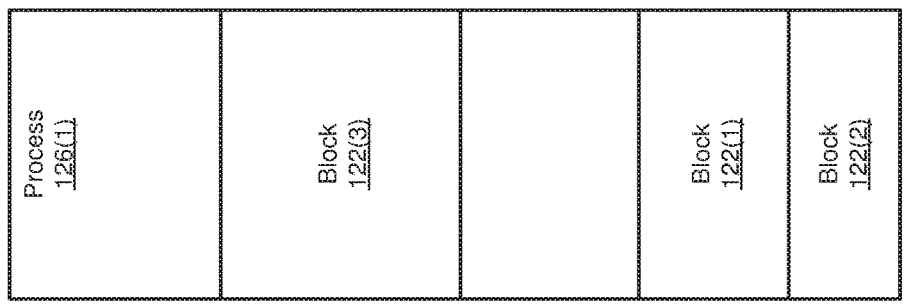
Figure 4:

As a specific example, a memory mapping 400 in FIG. 4 may involve and/or include loading or mapping blocks 122(1), 122(2), and 122(3) to different virtual addresses of processes 126(1), 126(2), and 126(3). In this example, the relative positions of blocks 122(1)-(3) within processes 126(1)-(3) in FIG. 4 may correspond to and/or represent relative virtual addresses of processes 126(1)-(3). For example, the same position across processes 126(1)-(3) in FIG. 4 may correspond to and/or represent the same virtual address relative to each process.

As illustrated in FIG. 4, memory mapping 400 in FIG. 4 may involve and/or include block 122(1) being loaded and/or mapped to a first virtual address of process 126(1), a second virtual address of process 126(2), and/or a third virtual address of process 126(3). Similarly, memory mapping 400 in FIG. 4 may involve and/or include block 122(2) being loaded and/or mapped to a fourth virtual address of process 126(1), a fifth virtual address of process 126(2), and/or a sixth virtual address of process 126(3). In addition, memory mapping 400 in FIG. 4 may involve and/or include block 122(3) being loaded and/or mapped to a seventh virtual address of process 126(1), an eighth virtual address of process 126(2), and/or a ninth virtual address of process 126(3). In this example, all these virtual addresses across processes 126(1)-(3) may differ from one another.

Returning to FIG. 3, at step 320 one or more of the systems described herein may determine, for a process within the plurality of processes, a local pointer that references a specific portion of the block of shared memory from a shared memory pointer that is shared across the plurality of processes. For example, determination module 106 may, as part of network device 206 in FIG. 2, determine and/or compute a local pointer 242 that references a specific portion of block 122(1) of shared memory 120 for process 126(1). In this example, determination module 106 may determine and/or compute local pointer 242 from and/or based on a shared memory pointer 240.

In some embodiments, local pointer 242 may correspond to and/or represent the mapping between block 122(1) and process 126(1). Accordingly, local pointer 242 may be specific to process 126(1). In other words, local pointer 242 may fail to accurately and/or properly reference the specific portion of block 122(1) for process 126(N). Although not illustrated in this way in FIG. 2, system 200 may include and/or represent various other local pointers that correspond to the mappings of other processes included in processes 124.

The systems described herein may perform step 320 in a variety of ways and/or contexts. In some examples, determination module 106 may search, examine, and/or inspect shared memory pointer 240 for information and/or data relevant to converting shared memory pointer 240 to a local pointer for the corresponding process. During such a search, examination, and/or inspection, determination module 106 may identify and/or locate certain information and/or data that facilitates converting shared memory pointer 240 to a local pointer for that process. For example, determination module 106 may, at step 320(1) in FIG. 3, identify a block number assigned to a certain block of shared memory 120 within shared memory pointer 240. Additionally or alternatively, determination module 106 may, at step 320(2) in FIG. 3, identify an offset within shared memory pointer 240 that corresponds to a specific portion of the block relative to that process.

In one example, upon identifying the block number within shared memory pointer 240, determination module 106 may determine whether any of the tuples or data structures tracked and/or maintained in connection with that process correspond to and/or include that block number. In this example, if one of the tracked tuples or data structures corresponds to and/or includes that block number, determination module 106 may search that tuple for the base virtual address of the shared memory block. During that search, determination module 106 may find, identify, and/or locate the base virtual address of the shared memory block within that tuple or data structure.

In some examples, determination module 106 may convert shared memory pointer 240 into local pointer 242 by combining the base virtual address of the shared memory block and the offset identified within shared memory pointer 240. As a specific example, an implementation 500 may involve and/or include a virtual address space 526 of process 126(1). In this example, block 122(1) of shared memory 120 may be loaded and/or mapped to a base virtual address 522 within virtual address space 526 of process 126(1).

Figure 5:
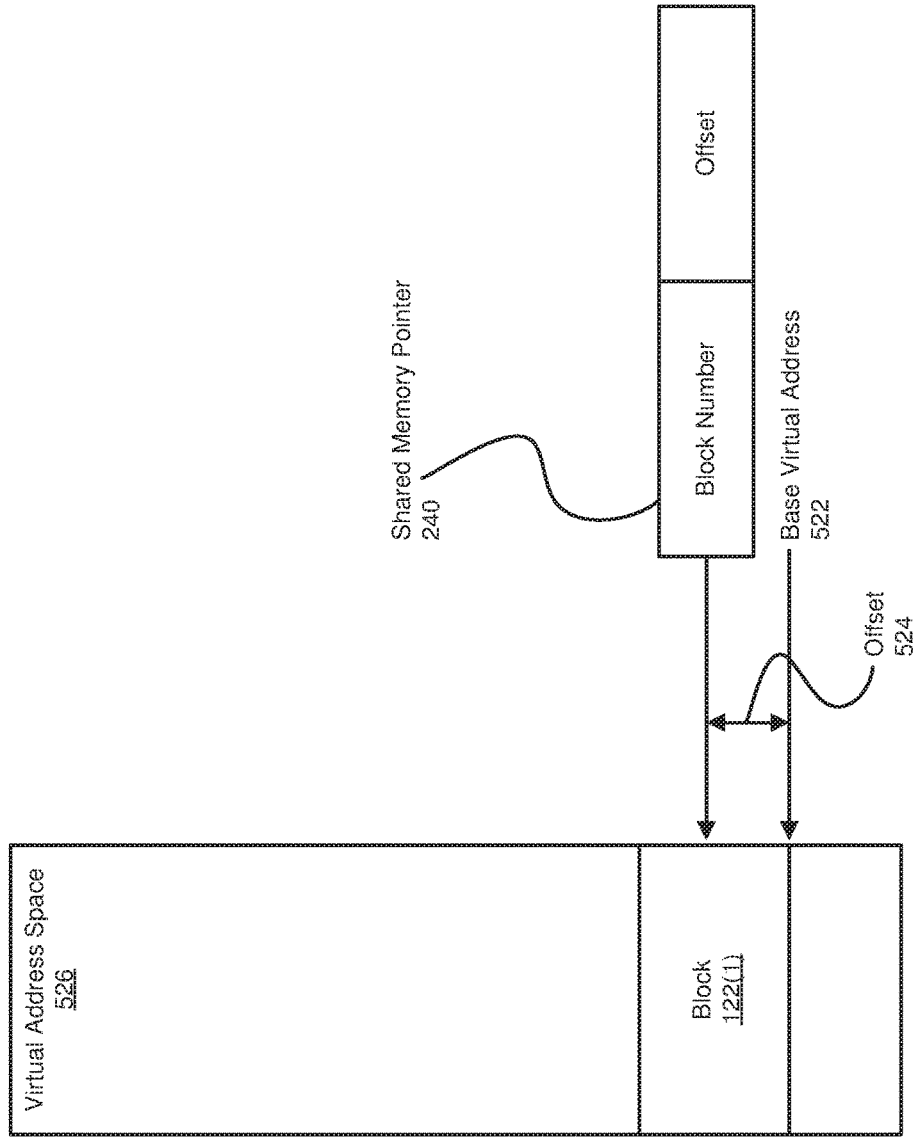
FIG. 5 is an illustration of an exemplary implementation of a shared memory pointer that includes a base virtual address and an offset relative to a process's virtual address space.

As illustrated in FIG. 5, a shared memory pointer 240 may include and/or represent the block number assigned to block 122(1) and an offset 524 corresponding to a specific portion of block 122(1) relative to process 126(1). In one example, shared memory pointer 240 may include and/or represent an abstract data type that reliably supports multiple memory mapped regions. In this example, the abstract data type may also handle and/or support regions of memory that have been remapped and/or have increased in size.

In one example, determination module 106 may receive, detect, and/or obtain shared memory pointer 240 in connection with a memory read and/or write operation. In this example, determination module 106 search, inspect, and/or examine shared memory pointer 240 for a block number and/or an offset. The block number may identify the block of shared memory 120 to which the memory read and/or write operation applies, and the offset may identify a specific portion of the block on which to perform the memory read and/or write operation. Upon identifying the block number, determination module 106 may use the block number to find the data structure that includes the tuple corresponding to the block referenced by shared memory pointer 240. For example, determination module 106 may search the tracked data structures for the one that includes the tuple data corresponding to the mapping between the block to which the block number is assigned and process 126(1).

Upon identifying the tracked data structure corresponding to the block number included in shared memory pointer 240, determination module 106 may search the tracked data structure for the base virtual address of the corresponding block. For example, during the search of the tracked data structure, determination module 106 may identify base virtual address 522 as being the address to which the referenced block is loaded into virtual address space 526 of process 126(1). In addition, during the search of shared memory pointer 240, determination module 106 may identify offset 524 as specifying the portion of block 122(1) to undergo the memory read and/or write operation. Determination module 106 may then compute the local pointer corresponding to shared memory pointer 240 relative to process 126(1) by combining base virtual address 522 and offset 524.

In some examples, one of processes 124 may write data to a block of shared memory 120 without necessarily notifying the rest of processes 124 of the same. As a result of this data write, the block of shared memory 120 may grow and/or increase in size. If the block of shared memory 120 grows to the point that shared memory pointer 240 no longer references a region within that block, the rest of processes 124 may still be able to access the data referenced by shared memory pointer 240. Moreover, regardless of whether the block of shared memory 120 grows that much, the rest of processes 124 may be able to discover and/or access the data written to that block by the writing process.

As a specific example, process 126(2) in FIG. 4 may write new data to block 122(1). In this example, the addition of this new data may cause block 122(1) to increase in size. If the new data is written to block 122(1) between base virtual address 522 and the specific portion referenced by and/or corresponding to offset 524, the new data may effectively push the specific portion referenced by and/or corresponding to offset 524 outside block 122(1), thereby rendering that portion inaccessible via shared memory pointer 240 unless block 122(1) is remapped to account for this new data. In other words, the addition of this new data may effectively cause offset 524 to overrun the limit of block 122(1).

To avoid this scenario, if the newly written data pushes offset 524 outside block 122(1), process 126(1) and/or process 126(2) may initiate remapping block 122(1) to account for this new data. For example, upon writing this new data to block 122(1), process 126(2) may execute and/or perform an "mremap( )" function call that remaps block 122(1) to the virtual address space of process 126(2). In this example, process 126(2) may update its tracking data structure to reflect and/or account for the remapping between block 122(1) and process 126(2).

Additionally or alternatively, after process 126(1) has written this new data to block 122(1), process 126(1) may check whether offset 524 still falls within block 122(1). If offset 524 no longer falls within block 122(1), process 126(1) may execute and/or perform an "mremap( )" function call that remaps block 122(1) to the virtual address space of process 126(1) to account for the growth of block 122(1). In this example, process 126(1) may update its tracking data structure to reflect and/or account for the remapping between block 122(1) and process 126(1).

In some examples, determination module 106 may compare local pointer 242 and/or the combination of base virtual address 522 and offset 524 to the size of block 122(1). In such examples, this comparison may indicate whether offset 524 still falls within block 122(1) or whether offset 524 now overruns block 122(1). In one example, if offset 524 still falls within block 122(1), then determination module 106 may determine and/or confirm that shared memory pointer 240 still references block 122(1). However, if offset 524 no longer falls within block 122(1), then determination module 106 may determine and/or discover that shared memory pointer 240 no longer references block 122(1) and/or that offset 524 now overruns block 122(1).

In some examples, in response to the determination that shared memory pointer 240 no longer references block 122(1), mapping module 104 may remap block 122(1) to process 126(1) (and/or to any other impacted processes). In such examples, mapping module 104 and/or tracking module 110 may update the tracked data structure of process 126(1) (and/or any other impacted processes) to reflect and/or account for this remapping.

Figure 6:
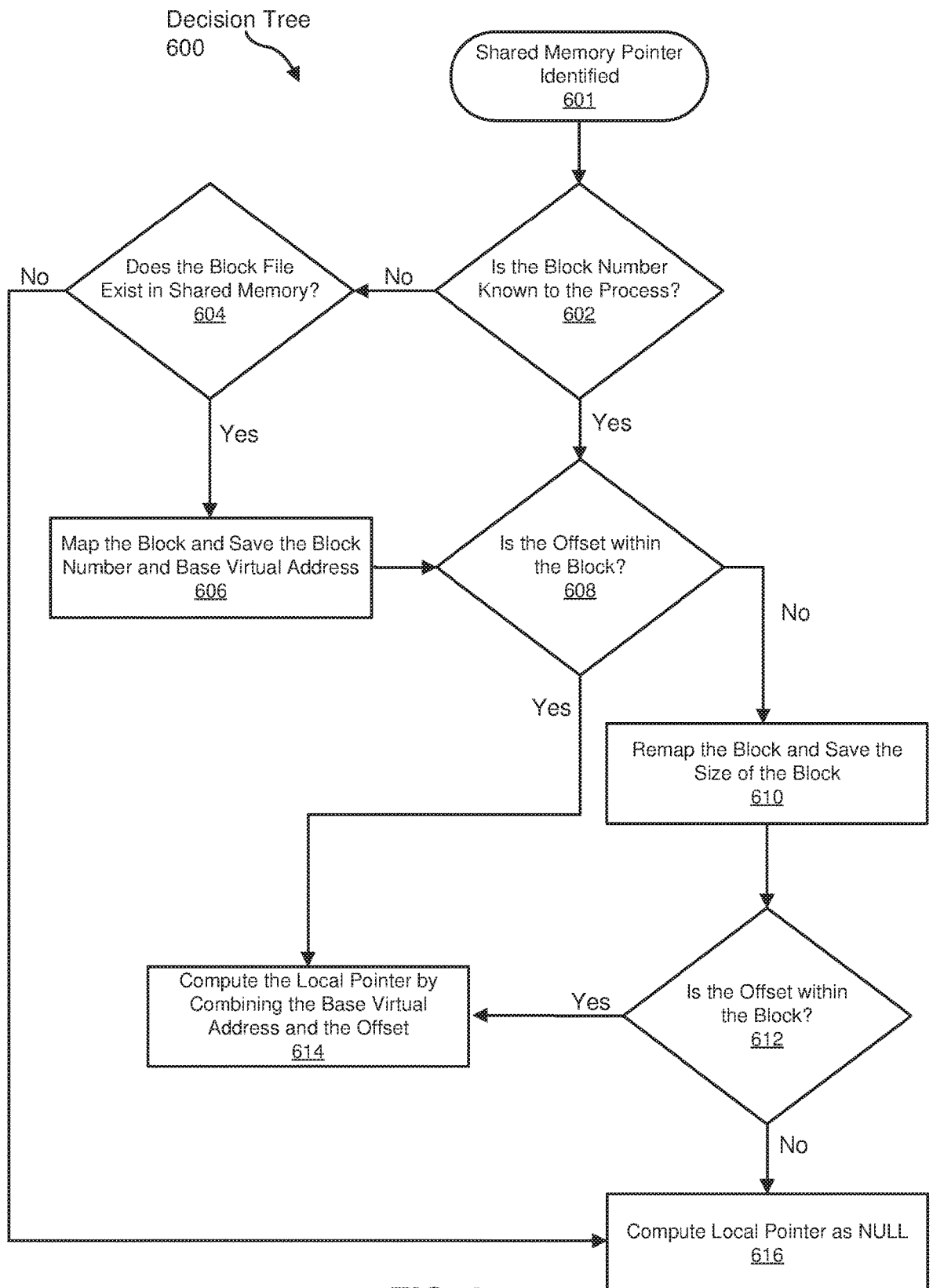
FIG. 6 is a flow diagram of an exemplary decision tree for sharing memory pointers across multiple processes.

FIG. 6 illustrates an exemplary decision tree 600 for sharing memory pointers across multiple processes. As illustrated at step 601 in FIG. 6, a process may identify a shared memory pointer that references a specific portion of shared memory. At step 602 in FIG. 6, the process may check whether the block number included in the shared memory pointer is known or unknown. On the one hand, if the block number is known to the process, the process may advance to step 608 in FIG. 6 to determine whether the offset included in the shared memory pointer falls within the referenced block of shared memory. On the other hand, if the block number is not known to the process, the process may advance to step 604 in FIG. 6 to determine whether the block file corresponding to the block number included in the shared memory pointer exists in shared memory.

Returning to step 608 in FIG. 6, if the offset falls within the block of shared memory, the process may advance to step 614 in FIG. 6 to compute a local pointer corresponding to the shared memory pointer by combining the base virtual address of the block and the offset. However, if the offset overruns the block of shared memory, the process may advance to step 610 in FIG. 6 to remap the block and/or record the size of the block within the corresponding tracked data structure.

Returning to step 604 in FIG. 6, if the block file corresponding to the block number exists in shared memory, the process may advance to step 606 in FIG. 6 to map the block and/or record the block number assigned to the block and the base virtual address of the block. However, if the block file corresponding to the block number exists in shared memory, the process may advance to step 616 in FIG. 6 to compute a local pointer as a null value for the shared memory pointer.

Returning to step 610 in FIG. 6, upon remapping the block and/or recording the size of the block within the corresponding tracked data structure, the process may advance to step 612 in FIG. 6 to determine whether the offset falls within the remapped block. On the one hand, if the offset does fall within the remapped block, the process may advance to step 614 in FIG. 6 to compute a local pointer corresponding to the shared memory pointer by combining the base virtual address of the remapped block and the offset. On the other hand, if the offset does not fall within the remapped block, the process may advance to step 616 in FIG. 6 to compute a local pointer as a null value for the shared memory pointer.

Returning to FIG. 3, at step 330 one or more of the systems described herein may perform an operation on the specific portion of the block of shared memory based at least in part on the local pointer. For example, operation module 108 may, as part of network device 206 in FIG. 2, perform an operation on the specific portion of block 122(1) based at least in part on local pointer 242. In this example, the operation may include and/or represent a read or write operation executed and/or performed at the specific portion of block 122(1).

The systems described herein may perform step 330 in a variety of ways and/or contexts. In some examples, operation module 108 may locate the specific portion of block 122(1) via local pointer 242. For example, local pointer 242 may indicate and/or render the virtual address of the specific portion of block 122(1) relative to process 126(1). Operation module 108 may then perform and/or execute a read operation that involves reading data stored in a data structure at the specific portion of block 122(1). Additionally or alternatively, operation module 108 may perform and/or execute a write operation that involves writing data to a data structure at the specific portion of block 122(1).

Although many of the descriptions provided above make specific reference to block 122(1) and/or process 126(1), these descriptions may apply equally to any of the blocks included in shared memory 120 and/or to any of processes 124. For example, determination module 106 may determine, from shared memory pointer 240, a local pointer that references a specific portion of block 122(1) relative to process 126(2) in FIG. 4. In this example, operation module 108 may then perform a read or write operation on the specific portion of block 122(1) based at least in part on that local pointer.

Figure 7:
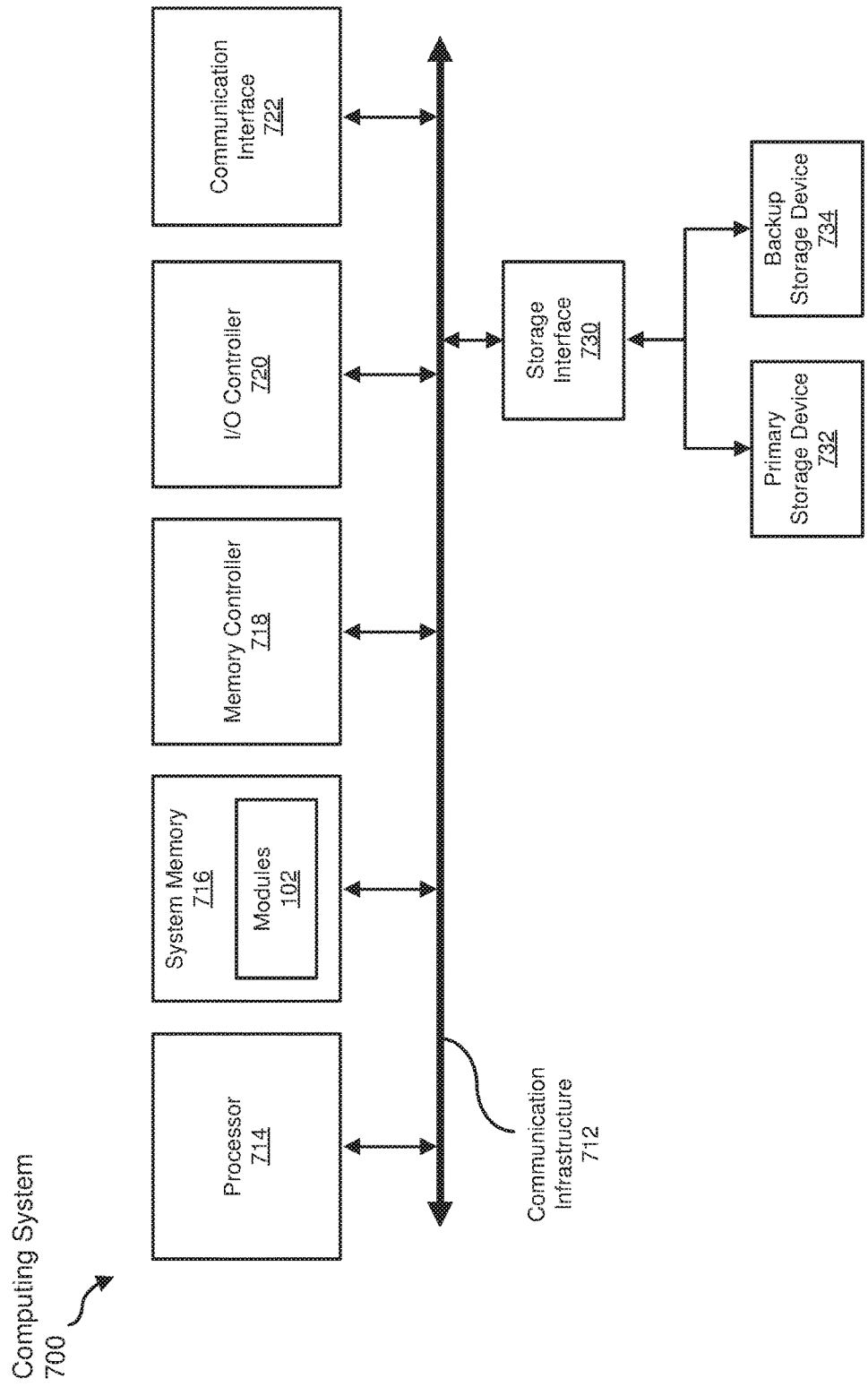
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   mapping a block of shared memory to a plurality of processes running on a computing device;
   determining, fora process within the plurality of processes, a local pointer that references a specific portion of the block of shared memory from a shared memory pointer that is shared across the plurality of processes by:
   identifying, within the shared memory pointer, a block number assigned to the block of shared memory;
   identifying, within the shared memory pointer, an offset that corresponds to the specific portion of the block of shared memory relative to the process;
   determining a base virtual address of the block of shared memory based at least in part on the block number; and
   converting, by the process, the shared memory pointer into the local pointer by combining the base virtual address and the offset to reference the specific portion of the block;
   identifying a size of the block of shared memory;
   comparing the combination of the base virtual address and the offset to the size of the block;
   determining, based at least in part on the comparison, that the shared memory pointer no longer references the block;
   in response to determining that the shared memory pointer no longer references the block, resizing the block of shared memory as mapped to the process to account for an increase in the size of the block of shared memory;
   updating a data structure of the process to reflect the resizing of the block to the process; and
   performing an operation on the specific portion of the block of shared memory based at least in part on the local pointer.

2. The method of claim 1, wherein the operation comprises at least one of:
   a read operation that involves reading data stored in a data structure at the specific portion of the block of shared memory; or
   a write operation that involves writing data to a data structure at the specific portion of the block of shared memory.

3. The method of claim 1, wherein mapping the block of shared memory to the plurality of processes comprises:
   loading, by the process, the base virtual address of the block of shared memory into a virtual address space of the process; and
   loading, by an additional process within the plurality of processes, an additional base virtual address of the block of shared memory into the virtual address space of the additional process.

4. The method of claim 3, wherein mapping the block of shared memory to the plurality of processes comprises:
   associating, by the process, the block number assigned to the block of shared memory with the base virtual address loaded into the virtual address space of the process; and
   associating, by the additional process, the block number assigned to the block of shared memory with the additional base virtual address loaded into the virtual address space of the additional process.

5. The method of claim 1, wherein identifying the size of the block of shared memory comprises:
   searching the shared memory for the block based at least in part on the block number; and
   determining the size of the block during the search based at least in part on the block number.

6. The method of claim 5, further comprising tracking the block number assigned to the block, the base virtual address of the block, and the size of the block in the data structure of the process.

7. A system comprising:
   a mapping module, stored in memory, that maps a block of shared memory to a plurality of processes running on a computing device;
   a determination module, stored in memory, that:
   determines, for a process within the plurality of processes, a local pointer that references a specific portion of the block of shared memory from a shared memory pointer that is shared across the plurality of processes by:
   identifying, within the shared memory pointer, a block number assigned to the block of shared memory;

identifying, within the shared memory pointer, an offset that corresponds to the specific portion of the block of shared memory relative to the process;

determining a base virtual address of the block of shared memory based at least in part on the block number; and converting, by the process, the shared memory pointer into the local pointer by combining the base virtual address and the offset to reference the specific portion of the block;

identifies a size of the block of shared memory;

compares the combination of the base virtual address and the offset to the size of the block;

determines, based at least in part on the comparison, that the shared memory pointer no longer references the block;

wherein the mapping module:

resizes the block of shared memory as mapped to the process to account for an increase in the size of the block of shared memory; and updates a data structure of the process to reflect the resizing of the block to the process;

further comprising:

an operation module, stored in memory, that performs an operation on the specific portion of the block of shared memory based at least in part on the local pointer; and at least one physical processor configured to execute the mapping module, the determination module, and the operation module.

8. The system of claim 7, wherein the operation comprises at least one of:

a read operation that involves reading data stored in a data structure at the specific portion of the block of shared memory; or a write operation that involves writing data to a data structure at the specific portion of the block of shared memory.

9. The system of claim 7, wherein, to map the block of shared memory to the plurality of processes, the mapping module:

loads, by the process, the base virtual address of the block of shared memory into a virtual address space of the process; and loads, by an additional process within the plurality of processes, an additional base virtual address of the block of shared memory into the virtual address space of the additional process.

10. The system of claim 9, wherein, to map the block of shared memory to the plurality of processes, the mapping module:

associates, by the process, the block number assigned to the block of shared memory with the base virtual address loaded into the virtual address space of the process; and associates, by the additional process, the block number assigned to the block of shared memory with the additional base virtual address loaded into the virtual address space of the additional process.

11. The system of claim 7, wherein the determination module identifies the size of the block of shared memory by:

searching the shared memory for the block based at least in part on the block number; and determining the size of the block during the search based at least in part on the block number.

12. The system of claim 11, further comprising a tracking module, stored in memory, that tracks the block number assigned to the block, the base virtual address of the block, and the size of the block in a data structure of the process.

13. A non-transitory computer-readable medium comprising one or more computer-executable instructions that, when executed by at least one processor of a computing device, cause the computing device to:

map a block of shared memory to a plurality of processes running on the computing device;

determine, for a process within the plurality of processes, a local pointer that references a specific portion of the block of shared memory from a shared memory pointer that is shared across the plurality of processes by:

identifying, within the shared memory pointer, a block number assigned to the block of shared memory;

identifying, within the shared memory pointer, an offset that corresponds to the specific portion of the block of shared memory relative to the process;

determining a base virtual address of the block of shared memory based at least in part on the block number; and converting, by the process, the shared memory pointer into the local pointer by combining the base virtual address and the offset to reference the specific portion of the block;

identify a size of the block of shared memory;

compare the combination of the base virtual address and the offset to the size of the block;

determine, based at least in part on the comparison, that the shared memory pointer no longer references the block;

in response to determining that the shared memory pointer no longer references the block, resize the block of shared memory as mapped to the process to account for an increase in the size of the block of shared memory;

update a data structure of the process to reflect the resizing of the block to the process; and perform an operation on the specific portion of the block of shared memory based at least in part on the local pointer.

* * * * *